United States Patent [19]

Schwartz et al.

[11] 4,197,823
[45] Apr. 15, 1980

[54] SUPPLEMENTARY AIR VALVE FOR A FUEL SUPPLY APPARATUS

[75] Inventors: Reinhard Schwartz; Peter Schelhas, both of Stuttgart, Fed. Rep. of Germany

[73] Assignee: Robert Bosch GmbH, Stuttgart, Fed. Rep. of Germany

[21] Appl. No.: 963,711

[22] Filed: Nov. 27, 1978

[30] Foreign Application Priority Data

Dec. 13, 1977 [DE] Fed. Rep. of Germany ....... 2755455

[51] Int. Cl.$^2$ .............................................. F02M 7/00
[52] U.S. Cl. .............................. 123/119 D; 123/124 B; 123/119 EC; 261/39 A
[58] Field of Search ...... 123/32 EA, 32 AE, 119 EC, 123/124 R, 124 B, 119 D; 261/39 A

[56] References Cited

U.S. PATENT DOCUMENTS

| 4,136,651 | 1/1979 | Hattori | 123/119 D |
| 4,148,848 | 4/1979 | Ogita | 123/124 R |

FOREIGN PATENT DOCUMENTS 1427981  3/1976  United Kingdom ................. 123/124 B

*Primary Examiner*—Ronald H. Lazarus
*Attorney, Agent, or Firm*—Edwin E. Greigg

[57] ABSTRACT

A supplementary air valve controlling a supplementary air quantity during the warm-up phase of an internal combustion engine. The supplementary valve is arranged in a lateral channel which bypasses the throttle valve and has a flat vane provided with a flow-through aperture; the vane is pivotable about a shaft eccentrically situated with respect to the flow-through aperture by means of a bimetallic spring provided with an electric heating coil energized through the engine ignition switch and which rotates the vane to uncover the cross-sectional areas of two spaced-apart, coaxially arranged air supply tubes which together form a part of the lateral channel and the vane has at least one further flow-through aperture for opening the cross-sectional area of a pressure control line which when closed, permits the induction tube pressure downstream of the throttle valve to prevail in the air control line, and when opened, the induction tube pressure upstream of the throttle valve prevails in the air control line.

5 Claims, 4 Drawing Figures

4,197,823

SUPPLEMENTARY AIR VALVE FOR A FUEL SUPPLY APPARATUS

BACKGROUND OF THE INVENTION

The invention is derived from a supplementary air valve of the type disclosed in British Pat. No. 1427.981 which is assigned to the assignee of this application. Such a supplementary air valve is already known and is for use with an internal combustion engine having a throttle device disposed in its inlet manifold for controlling the engine's speed, the supplementary valve being adapted to selectively bypass the throttle valve of the engine independence upon temperature.

OBJECT AND SUMMARY OF THE INVENTION

The supplementary air valve according to the invention has the advantage that in addition to controlling the supplementary air during the warmup phase of the internal combustion engine, the cross-sectional area of at least one pressure control line is controllable in dependence on temperature and/or time and that this can be accomplished simply, by the utilization of the essential components of the supplementary air valve.

The invention will be better understood as well as further objects and advantages thereof become more apparent from the ensuing detailed description of a preferred embodiment taken in conjunction with the drawing.

DESCRIPTION OF THE PREFERRED EMBODIMENT

Figure 1:
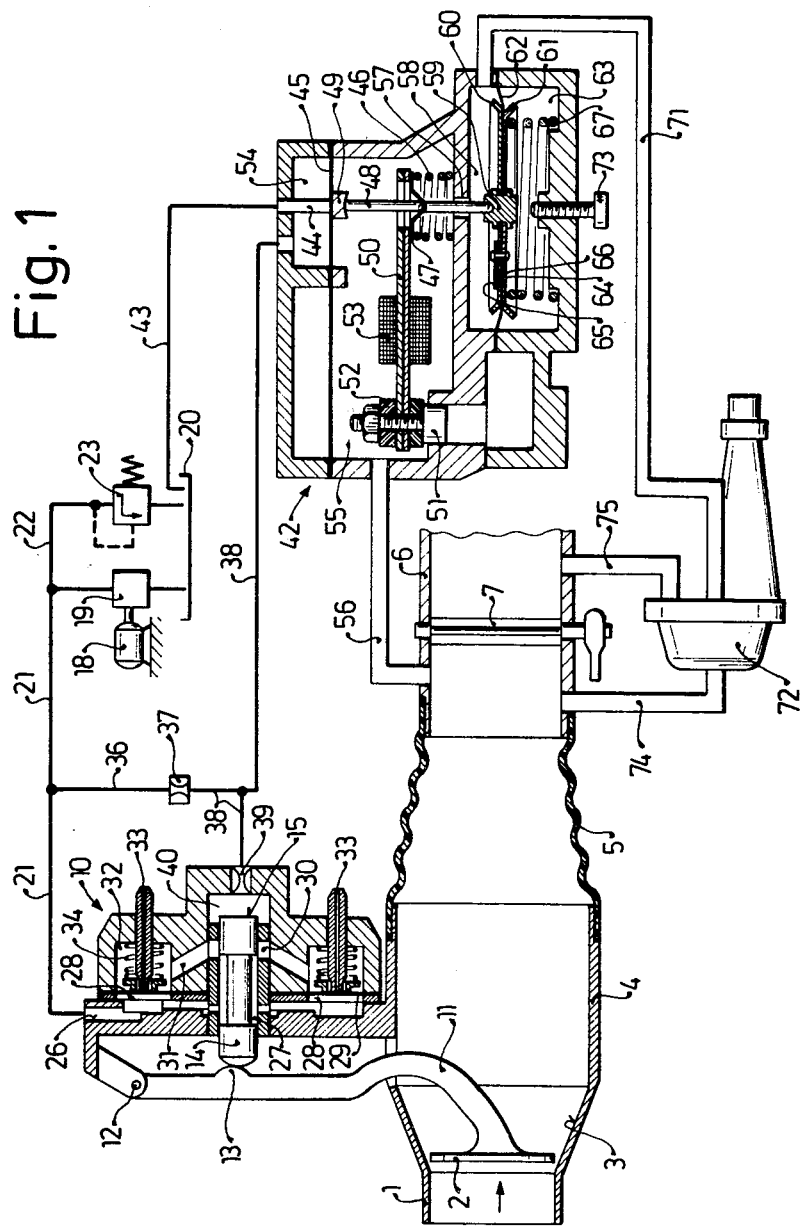
FIG. 1 shows a fuel injection apparatus with a supplementary air valve and a pressure control valve.

In the fuel injection system illustrated in FIG. 1, the combustion air flows in the direction of the arrow through a suction tube portion 1, (or, an induction tube), past a sensing element or air sensor 2, which is disposed in a conical portion 3. From the conical portion 3 the air flows in a suction tube portion 4, and thereafter through a coupling hose 5 into a suction tube portion 6, in which there is disposed an arbitrarily operable throttle valve (butterfly valve) 7. From the latter, the combustion air flows to one or more cylinders (not shown) of an internal combustion engine. The air sensor 2 consists of a plate, disposed at right angles to the direction of air flow, which is displaced in the conical suction tube portion 3 as an approximately linear function of the air flowing through the suction tube. Given a constant restoring force exerted on the air sensor 2 as well as a constant pressure prevailing upstream of the air sensor 2, the pressure prevailing between the air sensor 2 and the throttle valve 7 also remains constant.

The air sensor 2 directly controls a fuel metering and distributing valve 10. For the transmission of the motion of the air sensor 2, there is provided a lever 11, which is connected to the air sensor 2 at one end, and pivotably mounted on a pivot point 12 at the other end. The lever 11 is provided with a nose 13, and during the pivoting movement of the lever 11, the nose 13 actuates a movable slide member 14, which constitutes a control plunger of the fuel metering and distributing valve 10. A front face 15 of the control plunger 14, which is disposed remote from the nose 13, is exposed to the force of pressurized liquid. The pressure of this liquid acting on the face 15 produces the restoring force acting on the air sensor 2.

Fuel is supplied by means of a fuel pump 19, which is driven by an electric motor 18, and which draws fuel from a fuel tank 20, and delivers it through a conduit (or, fuel supply line) 21 to the fuel metering and distributing valve 10. From the conduit 21, there extends a conduit 22 in which is disposed a pressure limiting valve 23. When there is excessive pressure in the system, the pressure limiting valve 23 allows fuel to flow back into the fuel tank 20.

From the conduit 21, the fuel is admitted into a channel 26 provided in the housing of the fuel metering and distributing valve 10. The channel 26 leads to an annular groove 27 of the control plunger 14, and further leads through several branch conduits to chambers 28, which are disposed on one side of a membrane 29, so that this side of the membrane 29 is exposed to fuel pressure. Dependent upon the axial position of the control plunger 14, the annular groove 27 overlaps and, as a result, opens to a greater or lesser extent control slots 30, which lead through channels 31, to chambers 32. Each of the chambers 32 is separated from a corresponding chamber 28 by means of the membrane 29. From the chambers 32 the fuel is admitted through injection channels 33 to individual fuel injection valves (not shown) which are positioned in the suction tube in the vicinity of a corresponding engine cylinder. The membrane 29 serves as the movable part of a flat seat valve which is maintained open by means of a spring 34 when the fuel injection system is inoperative. The membrane boxes, each formed of a chamber 28 and 32, ensure that the pressure drop at the fuel metering valves 27, 30 remains substantially constant, independent of the overlap between the annular groove 27, and the control slots 30, that is, independent of the quantity of fuel flowing to the fuel injection valves. In this way, it is ensured that the extent of displacement of the control plunger 14 is proportionate to the metered fuel quantity.

Upon a pivotal movement of the lever 11, the air sensor 2 is moved in the conical portion 3 of the suction tube and, as a result, the annular flow passage section between the air sensor 2 and the conical portion 3, changes in proportion to the extent of the displacement of the air sensor 2.

The liquid producing the constant restoring force on the control plunger 14, is fuel. For this purpose, from the conduit 21, there extends a conduit 36, which is separated from a pressure control line 38 by means of an uncoupling throttle 37. A pressure chamber 40 communicates with the pressure control conduit 38 via a damping throttle 39. The front face 15 of the control plunger 14 projects into the pressure chamber 40.

A pressure control valve 42 is disposed in the control pressure line 38. The pressurized fluid can pass to the fuel tank 20 through a depressurized return conduit 43 via the pressure control valve 42. The pressure of the pressurized liquid producing the restoring force can be varied in a temperature-dependent manner and in dependence on the pressure drop at the throttle valve 7, by means of the pressure control valve 42. The pressure control valve 42 is in the form of a flat seat valve, having a stationary valve seat 44, and a valve membrane 45, which is biased in the closing direction of the valve, inter alia, by a spring 46. The valve spring 46 exerts pressure on the valve membrane 45 via a spring plate 47 and a transfer pin 48, which is supported on a spring rest 49. At temperatures below the engine operating temperature, the closing force transmitted to the pressure control valve 42 by the transfer pin 48 works against one end of a bi-metallic valve spring 50 which, during the warm-up stage, rests against the spring plate 47. The other end of the bi-metallic spring 50 is secured by means of a bolt 51 pressed into the housing of the pressure control valve 42. The bi-metallic valve spring 50 is largely protected against losing heat to the housing of the pressure control valve 42 by means of an insulating element 52 disposed between the bolt 51, and the bi-metallic valve spring 50. An electric heater 53 which can be switched on together with the ignition is placed on the bi-metalic valve spring 50.

The valve membrane 45 separates a control pressure space 54 from a spring space 55, which communicates via a pressure line 56 with the suction tube portions 4, 5 between air sensor 2 and throttle valve 7. The transfer pin 48 arranged in the spring space 55 projects with its end facing away from the valve membrane 45 through a throttle opening 57 into a first pressure space 58. The throttle opening 57 is arranged in the wall of the pressure control valve 42 which defines the spring space 55 and said throttle opening 57 has a diameter which permits a non-contact movement of the transfer pin 48. The transfer pin 48 is supported within the first pressure space 58 on a connecting element 59. This element 59 in turn is connected to two spring plates 60, 61 and sandwich therebetween a control membrane 62. The control membrane separates the first pressure space 58 from a second pressure space 63 and this latter space communicates via a throttle bore 64 with the first pressure space 58. In an advantageous manner, the control membrane 62 has a larger diameter than the valve membrane 45. The throttle bore 64 provides a valve opening 66 and is arranged as shown to be covered by a tongue valve 65, which is affixed on the spring plate 60 and adapted by a rivet to open toward the first pressure space 58. In the second pressure space 63 or lower chamber there is disposed a control spring 67 which acts on the control membrane 62 via the spring plate 61. It is also to be understood that the throttle bore 64 may also be provided, in a manner which is not shown, directly within the control membrane 62.

The first pressure space 58 communicates on one side via the throttle opening 57 with the spring space 55 and on the other side via an air control line 71 and a supplementary air valve 72 with either the suction tube section 6 downstream or with the suction tube section 4, 5 upstream. Thus, the diameter of the throttle opening 57 is kept sufficiently small that the idling rpm may be set sufficiently low. The movement of the control membrane 62 can be limited by means of the contact of the connecting element 59 on a stop 73, which can be arbitrarily adjustable and embodied, for example as shown in the drawing as a threaded member.

Accordingly, when the cold internal combustion engine is started, it is necessary to supply additional air thereto past the throttle valve, which in the idling setting is closed, so that the engine does not stall. This supplementary air quantity is furnished by means of the supplementary air valve 72 in dependence on time and temperature, while the additional fuel quantity appropriate to the supplementary air is controlled by means of the pressure control valve 42. The supplementary air valve, together with two air supply tubes 74 and 75, comprises a lateral channel (bypass) for circumventing the throttle valve 7 when it is closed for idling. To this end, the first air supply tube 74 is attached upstream of the throttle valve 7 to the suction tube 4, 5 between air sensor 2 and throttle valve 7. The second air supply tube 75 permits the supplementary air to enter the suction tube 6 directly downstream of the throttle valve 7.

Figure 2:
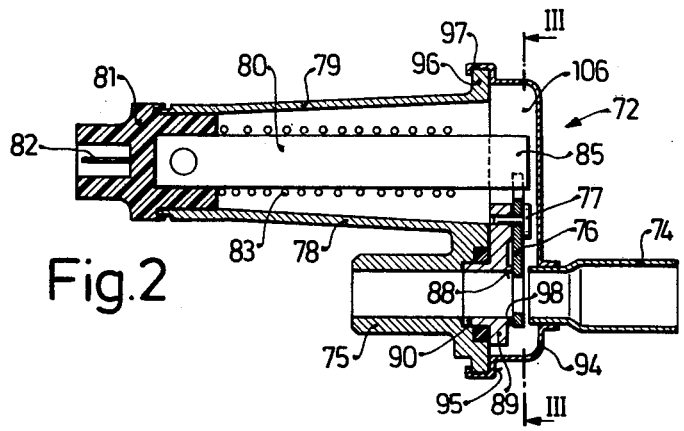
FIG. 2 is a cross-section through a supplementary air valve along the line II—II of FIG. 3.
Figure 3:
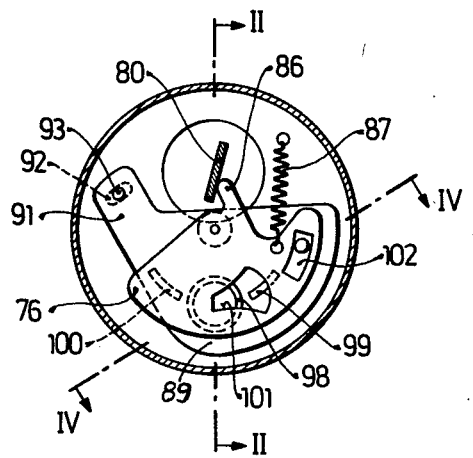
FIG. 3 is a cross-section through a supplementary air valve along the line III—III in FIG. 2.
Figure 4:
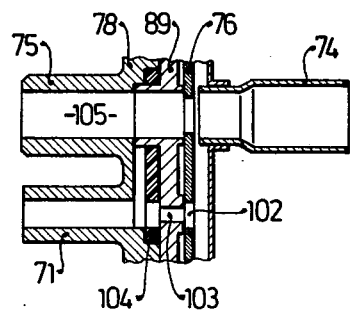
FIG. 4 is a cross-section through a supplementary air valve along the line IV—IV in FIG. 3.

As is shown in FIGS. 2-4, the supplementary air valve has a flat vane 76 which serves as a slider element, which is swingably arranged around an eccentrically placed shaft embodied by a bearing tang 77. When the vane 76 swings, it more or less opens up or blocks the minimum diameters of the two air supply tubes 74, and 75, which are arranged coaxially but at a distance from one another. The air supply tube 75, which may be attached to the suction tube portion 6 with the aid of a rubber hose, not shown, is integral with a housing 78, which is in the form of an elongated neck 79.

A bimetallic spring 80 is mounted so as to extend into the neck 79 and has one end portion securely embedded in a plug 81 which is pressed into the neck 79 and thereby forms a closure therefor. In two planes that are displaced parallel to the bimetallic spring 80 the plug 81 has two attachment tongues, one of which is shown at 82, in FIG. 2. This tongue 82 is connected with one end of a heating coil 83, while the other end thereof is attached to the second tongue on the plug, which is not shown. The free end 85 of the bimetallic spring 80 contacts a short lever portion 86 (see FIG. 3) which is cut into the curvilinear vane 76 when this element is first stamped out of a sheet of metal. The vane 76 is swung counterclockwise by a tension spring 87, as is shown in FIG. 3 and far enough that the lever portion 86 contacts the bimetallic spring 80.

When the heating coil 83 is switched on with the engine ignition and thereby conducts heat to the bimetallic spring 80, the free end of the spring 80 then presses with less force on the lever portion 86, so that the vane 76 is swung counterclockwise by means of the spring force. In this way the vane 76 increasingly reduces the flow-through cross-sectional area which is limited by a bore 88, so that the supplementary air is reduced to approximately zero until the normal operating temperature of the engine is reached.

In order to adjust the size of the flow-through cross-sectional area, a bearing plate 89 is provided which is arranged rotatably around a collar 90, the latter being concentric with the air supply tube 75 and with said bearing plate 89 arranged to support in a press-fit arrangement the bearing tang 77 for the vane 76. The bearing plate 89 has an integral laterally extending arm 91 and in proximity to the end thereof is provided with a slotted hole 92 through which a screw 93 projects so as to positively position the plate 89. When this screw is not tight, the bearing plate 89 can be swung within the confines of the slotted hole 92 and then can be fixed by tightening the screw 93. By this means a simple adjustment and control means is provided for the vane 76 and the bimetallic spring 80. The supplementary air valve has a housing cap 94, into which the air supply tube 74 is inserted. At its outer edge the housing cap includes a shoulder surface 95 which abuts the flangelike edge 96 of the housing 78 and is fixed thereto by means of deforming an annular lip 97 around the edge 96. The mass of the vane 76 as well as that of the bimetallic spring 80 are largely equalized with respect to the bearing tang 77.

In the illustrated embodiment of the supplementary air valve the arrangement is provided so that the vane 76 in its closing position is drawn by means of the suction tube underpressure, which is brought to bear through the second air supply tube 75, against a narrow sealing lip 98 on the front face of the bearing plate 89, said sealing lip 98 forming an extension of the bore 88. By this means the blocking action is increased. In order to secure smooth sliding action and avoid a lateral tipping of the vane 76, there are further provided two arch-shaped guidance ribs or protuberances 99 and 100, shown in FIG. 3 with broken lines, the offstanding surfaces of each of which lie in the same plane with the sealing lip 98.

The flow-through cross-sectional area between the two air supply tubes 74 and 75 is determined by the contour of a window 101 which is punched out of the vane 76. The window is so arranged that when the bimetallic spring 80 is not heated and when at the same time temperatures are low, the window 101 lies across the minimum cross-section of the two supply tubes 74 and 75. However, with increasing warmth and deflection of the bimetallic spring 80 the window 101 swings away from the vicinity of the air supply tubes 74 and 75 and thereby reduces the quantity of air flowing therethrough. It is to be understood that the frame of the window and the path taken by its contours, depending on the angle of deflection of the vane 76, will be different for the various designs of internal combustion engines. However, it can be very precisely determined for internal combustion engines of the same design, and it can be further set to accord with exact supplementary air quantities by adjusting the bearing plate 89.

As is shown in FIGS. 3 and 4, the vane 76 has at least one further flow-through aperture 102, which opens more or less widely a control opening 103 of the bearing plate 89 which leads to the air control line 71. A resilient sealing member 104 is provided in order to improve the seal between housing 78 and bearing plate 89. The air control line 71 via a channel 105 is also in communication with the air supply tube 75 toward the suction tube portion downstream of the throttle valve.

The mode of operation of the fuel injection apparatus shown is as follows:

When the internal combustion engine is running, fuel is induced from the fuel tank 20 by the fuel pump which is driven by the electromotor 18, and the fuel is delivered to the fuel metering and distributing valve 10 via the conduit 21. At the same time, the internal combustion engine takes in air via the suction tube portion 1, as a result of which the air sensor 2 undergoes a certain degree of deflection. In accordance with the deflection of the air sensor 2, the control plunger 14 is displaced as well, via the lever 11, thus opening a larger cross-sectional area of the control slot 30. The direct connection between air sensor 2 and control plunger 14 yields a constant ratio between air quantity and the apportioned fuel quantity, to the extent that the operating characteristics of these two devices are sufficiently linear, as is generally the case. The fuel-air mixture ratio would then be constant over the entire operational range of the engine. However, it is necessary to make the fuel-air mixture ratio richer or leaner depending on operational conditions of the internal combustion engine, and this is accomplished by varying the restoring force acting on the air sensor 2. To this end, the pressure control valve 42 is arranged in the control pressure line 38, with this valve being arranged to influence the fuel-air mixture proportion in accordance with temperature and when the load is changed, by means of influencing the pressure of the pressure fluid during the warm-up phase of the internal combustion engine until the operating temperature is reached. The closing force transferred onto the valve membrane 45 by the transfer pin 48 determines the control pressure. At temperatures below the operating temperature of the internal combustion engine, however, the bimetallic valve spring 50 acts upon the spring plate 47 counter to the force acting upon the transfer pin 48, by which means the closing force transferred onto the valve membrane 45 is reduced. Directly after the starting of the engine, however, a heating of the bimetallic valve spring 50 takes place via the electric heater 53, which results in a reduction of the force transferred by the bimetallic valve spring 50 onto the spring plate 47. The desired basic pre-stressing of the bimetallic valve spring 50 can be accomplished by means of pressing the bolt 51 to various depths in the housing of the pressure control valve 42.

Now in order to obtain an acceleration fuel quantity to enrich the fuel-air mixture when there is a sudden acceleration of the internal combustion engine, this acceleration fuel quantity, being in addition to the fuel quantity apportioned at the fuel metering and distributing valve 10 in accordance with the induced air quantity, the pressure of the pressure fluid in the control pressure line 38 and thus the restoring force on the air sensor 2 is reduced, so that when the flow-through air quantity remains the same at air sensor 2, a greater deflection of the air sensor and thus of the control plunger 14 results, by which means a larger fuel quantity is apportioned at the apportionment valve 27, 31.

The reduction of the pressure of the pressure fluid in the control pressure line 38 takes place because the suction tube pressure in the suction tube portion 6 downstream of the throttle valve 7 rises when there is a sudden acceleration of the internal combustion engine, whereby a pressure differential is produced at the control membrane 62, and this pressure differential leads to a reduction of the force of the control spring 67 on the transfer pin 48 and thus of the closing force on the valve membrane 45. The acceleration enrichment is defined in duration with respect to time by the selection of the cross-sectional area of the throttle bore 64, by which means a pressure equalization between the first pressure space 58 and the second pressure space 63 can take place. The volume of the second pressure space 63 serves as a further factor to set the duration of enrichment.

By means of the tongue valve 65, which opens when a higher pressure prevails in the second pressure space 63 than that in the first pressure space 58, it is possible to avoid an increase in the control pressure in the control pressure line 38 and thus to avoid a poorer fuel-air mixture when the throttle valve 7 closes.

In order to be able now to control the acceleration enrichment in accordance with temperature and/or time during the warm-up phase of the internal combustion engine, the air control line 71 to the first pressure space 58 of the pressure control valve 42 is controlled according to the invention by means of the supplementary air valve 72. Thus, at temperatures above approximately 40° C., by means of the flow-through aperture 102 of the vane 76, the control opening 103 to the chamber 106 of the supplementary air valve is opened, this chamber 106 being adapted to communicate with the air supply tube 74, so that the underpressure contacting the air control line 71 via the channel 105 is virtually reduced to atmospheric pressure, and pressure variations downstream of the throttle valve 7 resulting from actuations of the throttle valve have no further influence on the control membrane 62 and thus on the pressure control valve 42 and the restoring force of the air sensor 2. At temperatures below approximately 40° C., the vane 76, controlled by the bimetallic spring 80, closes the control opening 103, so that the air control line 71 communicates with the suction tube portion 6 downstream of the throttle valve, via the channel 105 and the air supply tube 75, and pressure changes become effective in the first pressure space 58.

The utilization of the supplementary air valve 72 for the control of the air control line 71 to the pressure control valve 42 makes possible, in a simple manner and employing the essential components of the supplementary air valve, the temperature-dependent and/or time-dependent control of the acceleration enrichment during the warm-up phase of the engine.

The foregoing relates to a preferred embodiment of the invention, it being understood that other embodiments and variants thereof are possible within the spirit and scope of the invention, the latter being defined by the appended claims.

What is claimed and desired to be secured by letters Patent of the United States is:

1. In a fuel supply apparatus for internal combustion engines having an induction tube and a throttle valve arranged in said induction tube and a lateral channel which bypasses said throttle valve, the improvement which comprises a supplementary air valve arranged in said lateral channel and further including a bimetallic spring, a flat vane provided with a flow-through aperture, said vane being pivotable about a shaft which is eccentrically situated with respect to said flow-through aperture by means of said bimetallic spring, an electric heating coil disposed about said bimetallic spring which can be switched on together with the ignition of said internal combustion engine to heat said bimetallic spring for pivotal movement of said vane by said bimetallic spring, two air supply tubes having cross-sectional areas arranged coaxially opposite and at a distance from each other and which are part of said lateral channel said vane being further arranged to partially uncover said cross-sectional areas of said two air supply tubes, at least one further pressure control line having a cross-sectional area and further wherein said vane is provided with means to open more or less widely said cross-sectional area of said at least one further pressure control line.

2. A supplementary air valve in accordance with claim 1, further wherein said means comprises a window-like flow-through aperture.

3. A supplementary air valve in accordance with claim 2, further wherein when said cross-sectional area of said pressure control line is closed by said vane, said induction tube pressure downstream of said throttle valve prevails in said pressure control line.

4. A supplementary air valve in accordance with claim 3, further wherein when said cross-sectional area of said pressure control line is opened by means of said flow-through aperture, said induction tube pressure upstream of said throttle valve prevails in said pressure control line.

5. A supplementary air valve in accordance with claim 4, further wherein, said pressure control line communicates with a first pressure space provided by a pressure control valve.

* * * * *